2,654,180

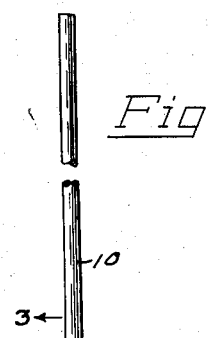
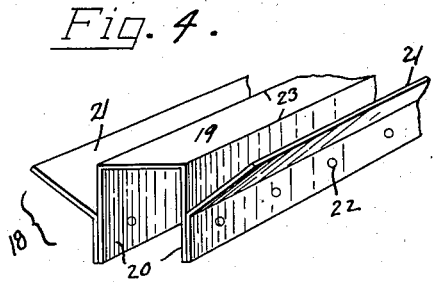
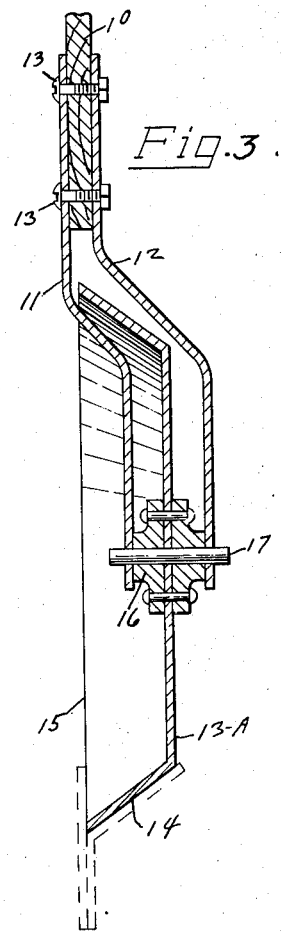
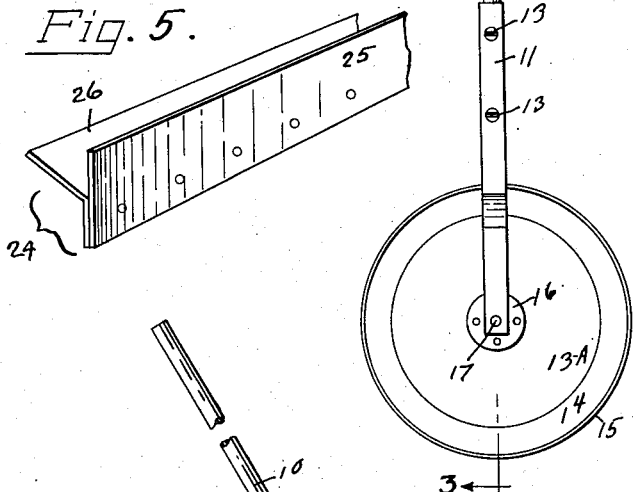
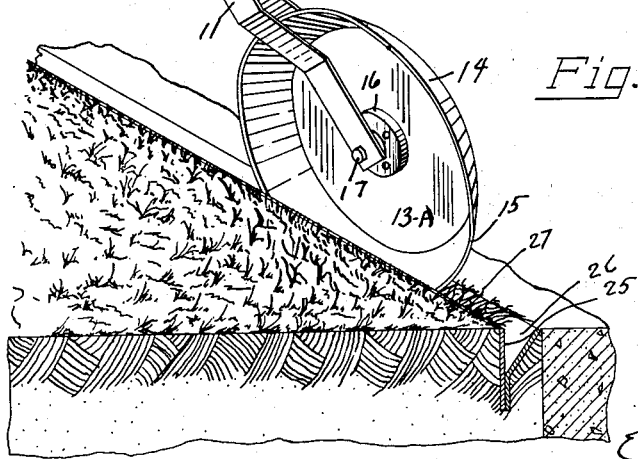
Oct. 6, 1953 — C. V. REDFIELD — 2,654,180
LAWN EDGER
Filed Nov. 3, 1948
INVENTOR
CHARLES V. REDFIELD
ATTORNEY Patented Oct. 6, 1953

UNITED STATES PATENT OFFICE 2,654,180

LAWN EDGER

Charles V. Redfield, Portland, Oreg.

Application November 3, 1948, Serial No. 58,058

1 Claim. (Cl. 47—33)

This invention relates generally to garden tools and particularly to a lawn edger.

The main object of this invention is to provide a means for sharply defining the edge of a lawn with a minimum amount of effort.

I accomplish this and other objects in a manner set forth in the following specification as illustrated in the accompanying drawing, in which:

Fig. 1 is a perspective view of the device showing it in actual use.

Fig. 2 is a side elevation of the edger.

Fig. 3 is a fragmentary section taken along the line 3—3 in Fig. 2.

Fig. 4 is a fragmentary perspective view of one form of track.

Fig. 5 is a fragmentary perspective view of a modified form of track.

Like numbers of reference refer to the same or similar parts throughout the several views.

Referring in detail to the drawings, there is shown an edging implement consisting of a handle 10, whose bent fork members 11 and 12 are secured to the handle 10 by means of the bolts 13.

Between the members 11 and 12 is mounted a pan-shaped wheel 13-A whose rim 14 is inclined with relation to the cutting edge 15. The hub 16 fits between the members 11 and 12 and the pin 17 extends through the members 11, 12, 13-A and 16.

Associated with the edger is a track 18 which consists of an inverted channel 19 to whose vertical side legs 20 are secured the out-turned flanges 21 by means of the spot welds 22, or in any other desired manner.

The corners 23 form the straight edge along which the cutting edge runs in a plane parallel to the sides 20. The V grooves formed by the sides 20 and flanges 21 equal the angle formed by the rim 14 and edge 15 of the wheel 13-A.

In the simplified form of the track 24, as shown in Fig. 5, the vertical side 25 is continuous while the flanged side 26 may be in short sections to permit bending the side 24 around curved margins of lawns.

In the use of the device with both forms of the track 18 and 24 it is required only to sink the track flush with the surface of the soil of the lawn and then run the edger along the track as shown in Fig. 1, thereby causing all of the grass blades 27, which overhang the side 21, to be cut off by the passing wheel edge 15. At the same time, the travel of the edger along the track produces a self-sharpening action instead of a dulling action as is the case when the track is not employed.

By the use of this device eighty per cent of the labor ordinarily required for edging a lawn is saved and the resulting work is performed with the utmost precision.

While I have thus illustrated and described my invention, I intend to cover such forms and modifications thereof as fall fairly within the appended claim.

A lawn edger comprising a metal border strip composed of an elongated metal strip imbedded in the ground in a vertical plane and having its top edge flush with the surface of the ground, a V-shaped trough formed along one side of said strip forming a track for a wheeled edger, said top edge constituting a shearing edge by movement of the wheeled edger therealong.

CHARLES V. REDFIELD.

References Cited in the file of this patent

UNITED STATES PATENTS

| Number | Name | Date |
|---|---|---|
| 527,604 | Hess | Oct. 16, 1894 |
| 1,181,281 | Albert | May 2, 1916 |
| 1,505,116 | Wiebe | Aug. 19, 1924 |
| 1,964,366 | Schwarz | June 26, 1934 |
| 2,094,519 | Ballard | Sept. 28, 1937 |
| 2,436,770 | Hill | Feb. 21, 1948 |
| 2,457,512 | Wheeler | Dec. 28, 1948 |

FOREIGN PATENTS

| Number | Country | Date |
|---|---|---|
| 307,505 | Germany | Jan. 31, 1918 |